United States Patent
Kwon et al.

(10) Patent No.: US 9,747,954 B2
(45) Date of Patent: Aug. 29, 2017

(54) VIDEO RECORDER

(71) Applicant: HANWHA TECHWIN CO., LTD., Changwon-si (KR)

(72) Inventors: Sung Jin Kwon, Changwon-si (KR); Nam Il Kim, Changwon-si (KR); Pil Jip Kim, Changwon-si (KR)

(73) Assignee: Hanwha Techwin Co., Ltd., Changwon-si (KR)

( * ) Notice: Subject to any disclaimer, the term of this patent is extended or adjusted under 35 U.S.C. 154(b) by 185 days.

(21) Appl. No.: 14/613,898

(22) Filed: Feb. 4, 2015

(65) Prior Publication Data

US 2015/0348592 A1 Dec. 3, 2015

(30) Foreign Application Priority Data

May 29, 2014 (KR) .................. 10-2014-0065321
May 29, 2014 (KR) .................. 10-2014-0065325

(51) Int. Cl.
*G11B 33/12* (2006.01)
*G11B 33/02* (2006.01)

(52) U.S. Cl.
CPC .......... *G11B 33/128* (2013.01); *G11B 33/123* (2013.01); *G11B 33/124* (2013.01)

(58) Field of Classification Search
CPC ... G11B 33/022; G11B 33/126; G11B 33/128; G11B 33/124; G11B 33/123; G11B 33/12; G11B 33/02
USPC ........................................................ 386/358
See application file for complete search history.

(56) References Cited

U.S. PATENT DOCUMENTS

| | | | |
|---|---|---|---|
| 4,769,741 A * | 9/1988 | Smith | H05K 1/148 361/736 |
| 7,140,918 B1 * | 11/2006 | Delaney | H01R 23/6873 439/607.06 |
| 2005/0117308 A1 * | 6/2005 | Harman | G11B 33/142 361/719 |
| 2010/0172086 A1 * | 7/2010 | Chen | G11B 33/128 361/679.33 |
| 2011/0211804 A1 * | 9/2011 | Yamamoto | H04N 5/64 386/230 |
| 2014/0049903 A1 | 2/2014 | Chen | |

FOREIGN PATENT DOCUMENTS

| | | | |
|---|---|---|---|
| JP | 3496705 B2 | 11/2003 | |
| KR | 1998-018790 U | 7/1998 | |
| KR | 10-2004-0074334 A | 8/2004 | |
| KR | 10-2006-0121043 A | 11/2006 | |
| KR | 10-2009-0110424 A | 10/2009 | |
| KR | 10-2012-0005872 A | 1/2012 | |
| KR | WO 2012064040 A2 * | 5/2012 | ......... H04N 5/23241 |

* cited by examiner

*Primary Examiner* — Thai Tran
*Assistant Examiner* — Nien-Ru Yang
(74) *Attorney, Agent, or Firm* — Sughrue Mion, PLLC

(57) ABSTRACT

Provided is a video recorder including a case body comprising a space for housing a plurality of electronic parts, the plurality of electronic parts including: an optical disk drive (ODD) holder attached to an ODD; and a hard disk drive (HDD) holder attached to an HDD; a front panel on which a front printed circuit board (PCB) is mounted and which covers a front side of the case body; and a rear panel on which a rear PCB is mounted and which covers a rear side of the case body.

18 Claims, 18 Drawing Sheets

223   213

223

213

VIDEO RECORDER

CROSS-REFERENCE TO RELATED APPLICATIONS

This application claims priority from Korean Patent Applications Nos. 10-2014-0065321 and 10-2014-0065325 filed on May 29, 2014 in the Korean Intellectual Property Office, the disclosures of which are incorporated herein by reference in their entireties.

BACKGROUND

1. Field

Apparatuses consistent with Exemplary embodiments relate to a video recorder, and more particularly, to a video recorder into which a plurality of parts can be assembled without using screws.

2. Description of the Related Art

In the analog era, video cassette recorders (VCR) were popular as storage devices. Now, video recorders using hard disks are popular as storage devices of digital images. Unlike a VCR that stores an image signal on a magnetic tape, a video recorder records information on a hard disk and reproduces the information.

In the related art, a video recorder such as a digital video recorder (DVR) or a network video recorder (NVR) includes a plurality of electronic parts within a case. In addition, a front panel having input units (e.g., buttons) for manipulation by a user is located on a front side of the case, and a rear panel having connection units for connection with an external device is located on a rear side of the case.

FIGS. 1 and 2 illustrate various assembly structures of video recorders of the related art. FIG. 3 illustrates a rear assembly structure of a video recorder of a related art.

Referring to FIG. 1, a switching mode power supply (SMPS) 1, an optical disk drive (ODD) 2, a hard disk drive (HDD) 3, a fan 4, etc. are installed within a case 5A. In addition, a main printed circuit board (PCB) M is installed in the case 5A. A front PCB F is installed on a front panel 7A, and a rear PCB R is installed on a rear panel 8A.

Referring to FIG. 2, various parts including an ODD 2 and an HDD 3 are installed in a space formed by a case 5B and a front panel 7B and a rear panel 8B which are respectively located on a front side and a rear side of the case 5B.

Here, the ODD 2 and the HDD 3, which are storage devices, are coupled to a bracket 6 by screws S.

Referring to FIG. 3, a rear PCB R is installed inside a rear panel 8. The rear PCB and the rear panel 8 are coupled to each other using two or more screws S.

If screws S are used to assemble parts together, when a video recorder is required to be assembled or disassembled by a production line assembler or a user, different types of tools (e.g., drivers) are needed according to the type or size of the screws S. In addition, assembling parts using screws S increases assembly time and creates a possibility that fixing parts such as the screws S will be lost.

That is, fixing parts using screws S requires tools such as drivers, thus reducing work convenience. In addition, since the time to couple the parts using the screws S is required, work efficiency is reduced. Therefore, fixing the parts using the screws S is not desirable in terms of productivity.

Accordingly, it is required to develop a method of coupling each removable part to a video recorder without using screws.

SUMMARY

One or more exemplary embodiments provide a video recorder which can be assembled easily and stably without using screws.

However, aspects of the inventive concepts are not restricted to the one set forth herein. The above and other aspects of the inventive concepts will become more apparent to one of ordinary skill in the art to which the inventive concepts pertains by referencing the exemplary embodiments provided below.

According to an aspect of an exemplary embodiment, there is provided a video recorder including: a case body comprising a space for housing a plurality of electronic parts, the plurality of electronic parts including: an optical disk drive (ODD) holder attached to an ODD; and a hard disk drive (HDD) holder attached to an HDD; a front panel on which a front printed circuit board (PCB) is mounted and which covers a front side of the case body; and a rear panel on which a rear PCB is mounted and which covers a rear side of the case body.

The ODD and the HDD may be detachably attached to the ODD holder and the HDD holder, respectively.

The case body and the front panel may be coupled to each other by a snap-fit structure, and the case body and the rear panel are coupled to each other by the snap-fit structure.

The snap-fit structure may include a hook and a hook groove, and one of the hook and the hook groove may be provided on one of the case body and the front or rear panel, and the other of the hook and the hook groove may be provided on the other of the case body and the front or rear panel.

The plurality of electronic parts may further include a switching mode power supply (SMPS) configured to be slid into the case body, and a fan holder having a detachable fan configured to be slid into the case body.

The case body may include: a guide hook configured to guide sliding of the SMPS and configured to support the SMPS on a front portion of the SMPS; support members configured to guide sliding of the SMPS and support the SMPS on side portions of the SMPS; and a stopper configured to fix the SMPS on a top surface of the SMPS.

The case body may include hook grooves, and the fan holder comprises holder fixing hooks, wherein the holder fixing hooks are configured to be inserted into the hook grooves.

The fan holder may further include fan fixing hooks configured to fix the fan to the fan holder.

The ODD holder may include: ODD holder hooks; and press pins, where the case body may include hook grooves, the ODD holder hooks configured to be inserted into the hook grooves, and where the press pins may be coupled to grooves provided on side surfaces of the ODD.

The HDD holder may provide a space for housing the HDD and may include: fixing protrusions configured to fix the HDD inside the space; and fastening holes configured to receive fastening members to fasten the HDD holder to the case body.

The fastening holes may be provided on side surfaces of the HDD holder.

The HDD holder may further include a guide member configured to guide installation of the ODD, where the ODD is configured to be installed on and connected to the HDD holder by the guide member, and where the HDD holder and the ODD holder are configured to be slidable as a single holder into the case body.

The HDD holder may include an HDD holder hook provided on a front side thereof.

The HDD holder may further include an HDD holder auxiliary hook provided on a rear side of the HDD holder and configured to be coupled to a frame of the case body.

The front panel may include guide ribs configured to couple the front PCB with the front panel in a snap-fit manner.

The front panel may include: a cover on which the front PCB is mounted; and a door configured to open or close the cover.

The cover may include: an insertion groove; and an extension groove cut along a part of an outer circumferential surface of the insertion groove.

The door may include: an insertion protrusion configured to be inserted into the insertion groove; and an extension protrusion extending from an end of the insertion protrusion, where in response to the extension protrusion rotating in the extension groove, an end of the extension protrusion contacts a middle region of the extension groove, and generate friction.

The rear panel may include a plurality of brackets configured to fix the rear PCB.

The rear panel may include a rear holder configured to support the rear PCB coupled to the rear panel in a snap-fit manner.

BRIEF DESCRIPTION OF THE DRAWINGS

The above and other aspects and features of the present invention will become more apparent by describing in detail exemplary embodiments thereof with reference to the attached drawings, in which.

DETAILED DESCRIPTION

Reference will now be made in detail to the exemplary embodiments, examples of which are illustrated in the accompanying drawings. The same reference numbers indicate the same components throughout the specification. In the attached figures, the thickness of layers and regions is exaggerated for clarity.

It will be understood that, although the terms first, second, etc. may be used herein to describe various elements, these elements should not be limited by these terms. These terms are only used to distinguish one element from another element. Thus, for example, a first element, a first component or a first section discussed below could be termed a second element, a second component or a second section without departing from the teachings of the inventive concept.

The use of the terms "a" and "an" and "the" and similar referents in the context of describing the inventive concept (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted.

Unless defined otherwise, all technical and scientific terms used herein have the same meaning as commonly understood by one of ordinary skill in the art to which this invention belongs. It is noted that the use of any and all examples, or exemplary terms provided herein is intended merely to better illuminate the invention and is not a limitation on the scope of the invention unless otherwise specified. Further, unless defined otherwise, all terms defined in generally used dictionaries may not be overly interpreted.

The present invention will now be described in more detail with reference to the attached drawings.

Figure 1:
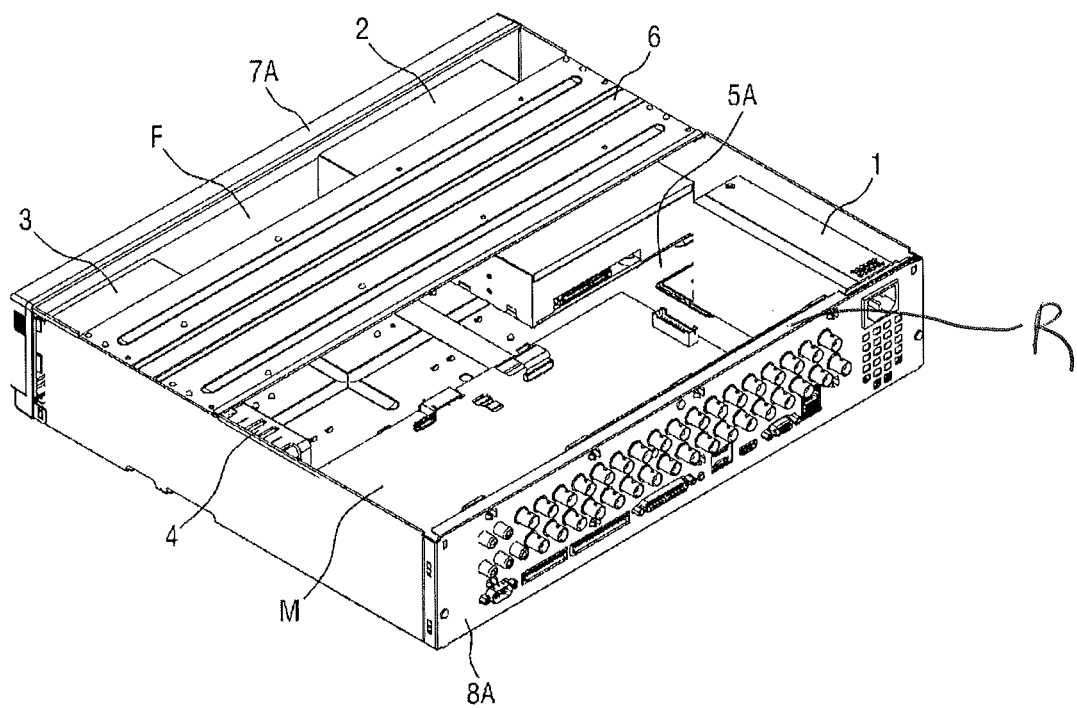
FIGS. 1 and 2 illustrate various assembly structures of video recorders of the related art.
Figure 2:
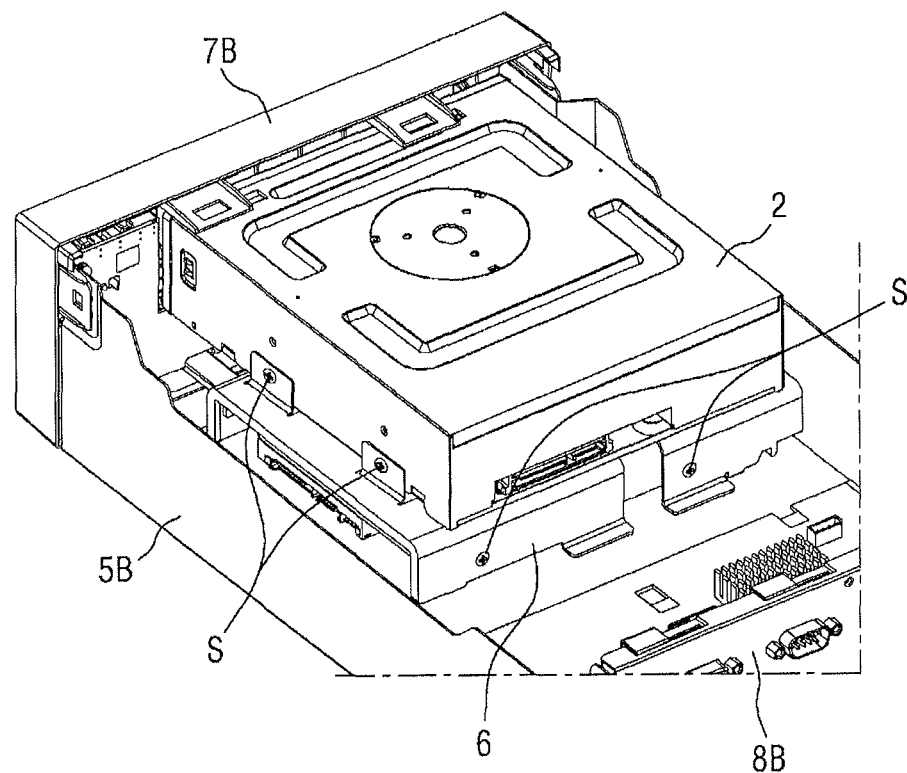
Figure 3:
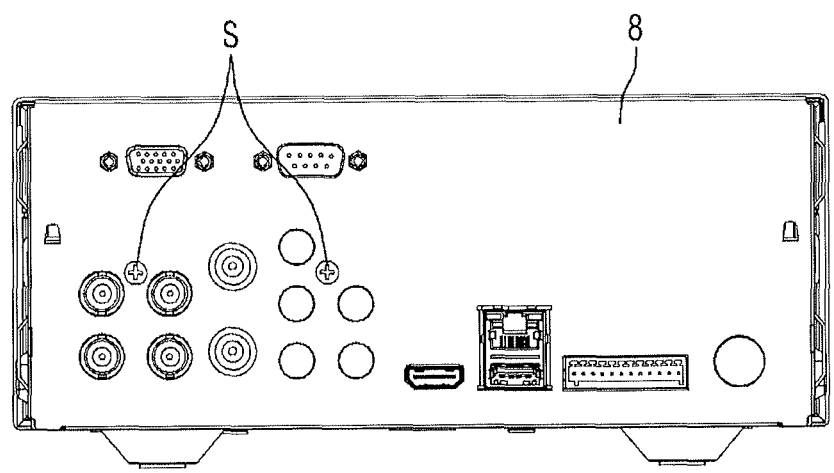
FIG. 3 illustrates a rear assembly structure of a video recorder of the related art.
Figure 4:
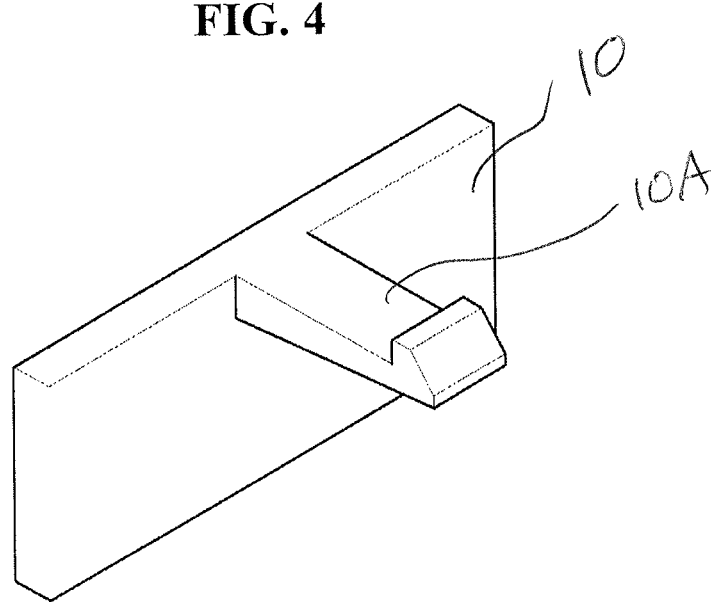
FIG. 4 is a perspective view of a snap-fit structure according to an exemplary embodiment.
Figure 5:
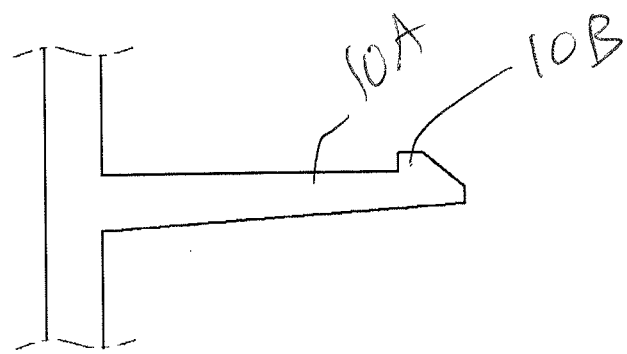
FIG. 5 is a cross-sectional view of the snap-fit structure of FIG. 4 according to an exemplary embodiment.

FIG. 4 is a perspective view of a snap-fit structure 10 according to an exemplary embodiment. FIG. 5 is a cross-sectional view of the snap-fit structure 10 according to an exemplary embodiment.

As described above, a video recorder of the related art is assembled by coupling major parts together using screws. In the exemplary embodiments, however, a video recorder is assembled using a snap-fit structure 10 instead of screws. Physical guides are installed to assemble parts together without using screws, and the snap-fit structure is adopted to make it easy to attach/separate the parts in a way that prevents the parts from being lost.

Referring to FIGS. 4 and 5, in the snap-fit structure 10, a protruding portion 10A extending in a predetermined direction has elasticity, and a protrusion 10B is formed at an end of the protruding portion 10A. Therefore, it is easy to couple or separate the protruding portion to or from another part. Hereinbelow, the snap-fit structure may be referred to as a "hook" or "hooks" along with a corresponding "groove" or "grooves" for the hook/hooks.

Figure 6:
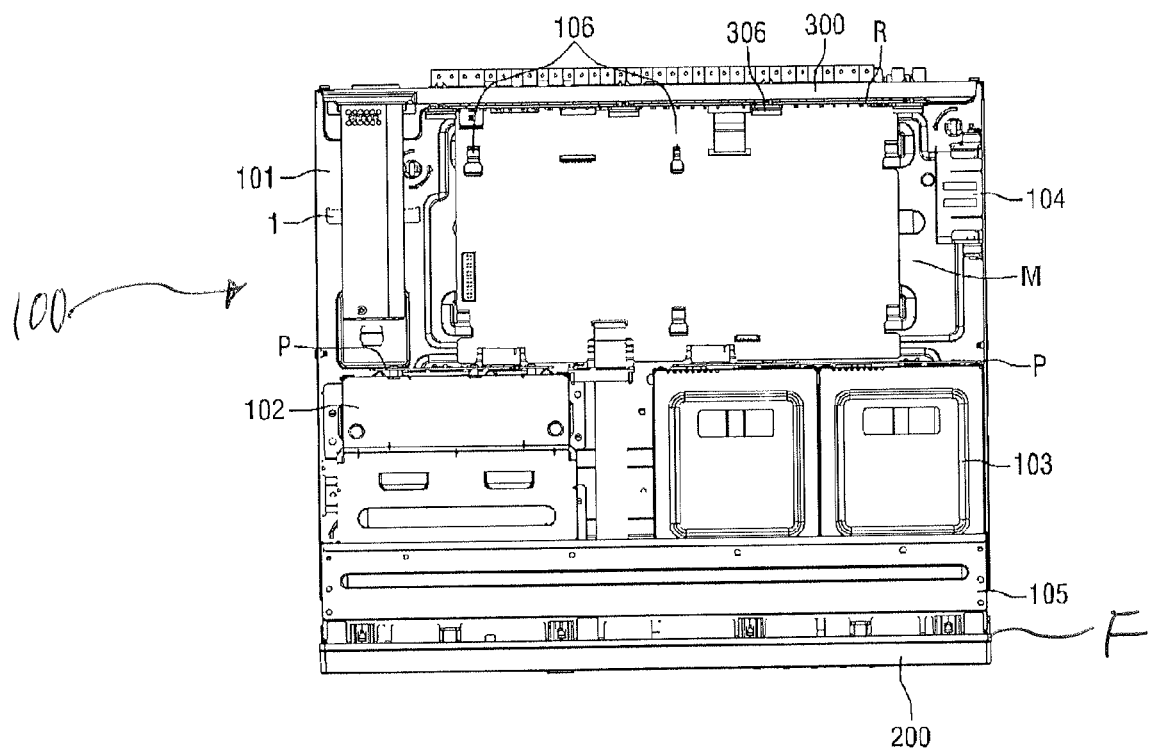
FIG. 6 is a top view of a video recorder according to an exemplary embodiment.

FIG. 6 is a top view of a video recorder according to an exemplary embodiment.

Referring to FIG. 6, the video recorder according to the exemplary embodiment includes a case body 100, a front panel 200, and a rear panel 300. A space for housing various electronic parts is formed inside the case body 100. In addition, an optical disk drive (ODD) holder 125 (FIG. 9) into or from which an ODD 2 can be inserted or removed and a hard disk drive (HDD) holder 130 (FIG. 11) into or from which an HDD 3 can be inserted or removed are slid into the case body 100. A front printed circuit board (PCB) F is installed on the front panel 200, and the front panel 200 covers a front side of the case body 100. A rear PCB R is installed on the rear panel 300, and the rear panel 300 covers a rear side of the case body 100. That is, storage devices such as the ODD 2 and the HDD 3 are installed in the case body 100, and the ODD 2 and the HDD 3 are slid into the case body 100 by structures such as the ODD holder and the HDD holder. In addition, the front panel 200 and the rear panel 300 are coupled to the case body 100 by a snap-fit structure 10 as shown in FIGS. 4 and 5. To this end, hooks and/or hook grooves may be formed in various portions of the case body 100 and the front and rear panels 200 and 300. After the assembly of the video recorder, a case cover (not illustrated) for closing an opening at the top of the case body 100 is connected to the top of the case body 100. The case cover may form only an upper surface of the case body 100 or the upper surface and at least one side surface of the case body 100.

The case body 100 may include hooks 106 used to install a main PCB M in the case body 100. In addition, the case body 100 may form various spaces (101 through 104) for housing electronic parts such as a switching mode power supply (SMPS) 1, the ODD 2, the HDD 3, and a fan 4, and various frames 105 may be installed in the case body 100. The case body 100 may include a lower surface and left and right side surfaces. The lower surface and the left and right side surfaces may be formed as a single surface or may be formed as separate surfaces and then assembled. In addition, the case body 100 may be made of a metallic conductive material or a plastic insulating material.

The SMPS 1 may be slid into the case body 100, and a fan holder 145 into or from which the fan 4 can be inserted or removed may be slid into the case body 100. For example, the case body 100 may include an SMPS installation area 101 into which the SMPS 1 is slid, an ODD installation area 102 into which the ODD holder having the removable ODD 2 is slid, an HDD installation area 103 into which the HDD holder having the removable HDD 3 is slid, and a fan installation area 104 into which the fan holder 145 (FIG. 8) having the removable fan 4 is slid. Various grooves and/or hooks used to assemble the SMPS 1, the ODD holder, the HDD holder, and the fan holder 145 in a sliding manner and/or a snap-fit manner may be included in the areas 101 through 104 in which electronic parts of the case body 100 are accommodated. Each of the grooves and/or hooks will be described in detail later.

Figure 7:
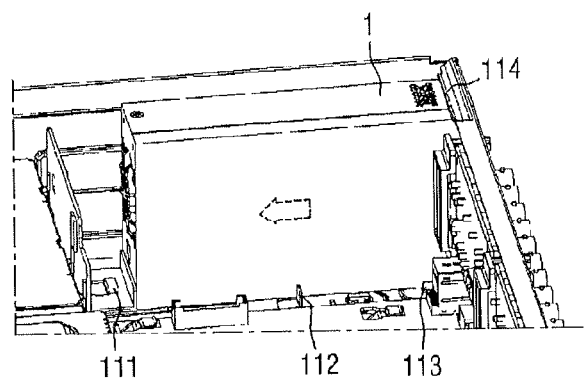
FIG. 7 illustrates an assembly structure of a switching mode power supply (SMPS) in the video recorder of FIG. 6 according to an exemplary embodiment.

FIG. 7 illustrates the assembly structure of the SMPS 1 in the video recorder of FIG. 6 according to an exemplary embodiment.

Referring to FIG. 7, the SMPS 1 is installed in the SMPS installation area 101. To this end, a guide hook 111, support members 112 and 113, a stopper 114, etc. may be installed in the SMPS installation area 101. The guide hook 111 guides the sliding of the SMPS 1 and supports the front of the SMPS 1. The support members 112 and 113 guide the sliding of the SMPS 1 and support the SMPS 1 on sides of the SMPS 1 and rear portions of the sides. The stopper 114 fixes the SMPS 1 at the top of the SMPS 1 as shown in FIG. 7.

Therefore, the SMPS 1 is slid in a predetermined direction to be installed in the SMPS installation area 101. Here, the guide hook 111 and the support members 112 and 113 help the SMPS 1 slide. Once the SMPS 1 is installed in the SMPS installation area 101, the SMPS 1 is fixed in position by the guide hook 111, the support members 112 and 113, and the stopper 114.

Figure 8:
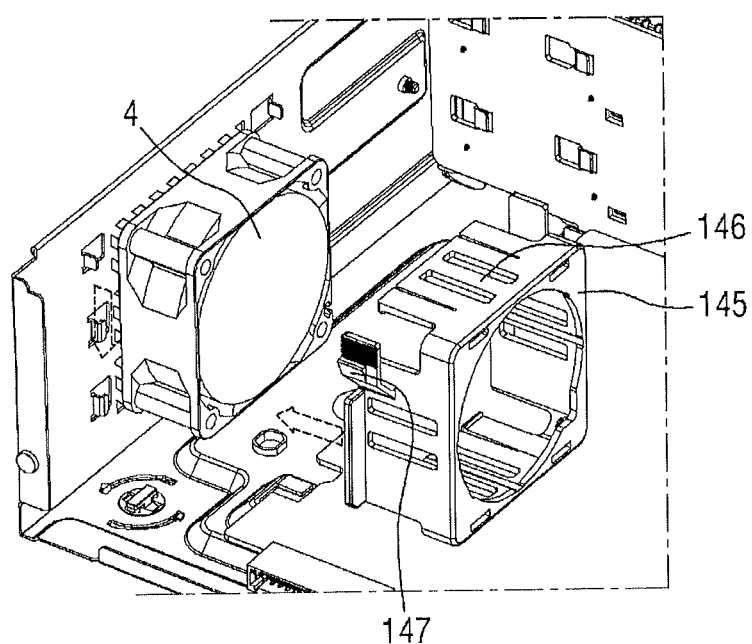
FIG. 8 illustrates the assembly structure of a fan in the video recorder of FIG. 6 according to an exemplary embodiment.

FIG. 8 illustrates the assembly structure of the fan 4 in the video recorder of FIG. 6 according to an exemplary embodiment.

Referring to FIG. 8, the fan 4 is pushed or slid into a fan holder 145 and then coupled to the fan holder 145 in a snap-fit structure 10 (i.e., fan fixing hooks 146). The fan holder 145 having the fan 4 coupled thereto is pushed in a predetermined direction, for example, a downward direction (as shown in dotted arrow) to be fixed in the fan installation area 104. Here, hook grooves (not shown) into which holder fixing hooks 147 of the fan holder 145 are inserted are formed in the fan installation area 104. As the holder fixing hooks 147 of the fan holder 145 are inserted into the hook grooves of the fan installation area 104, the fan holder 145 is fixed in the fan installation area 104.

Figure 9:
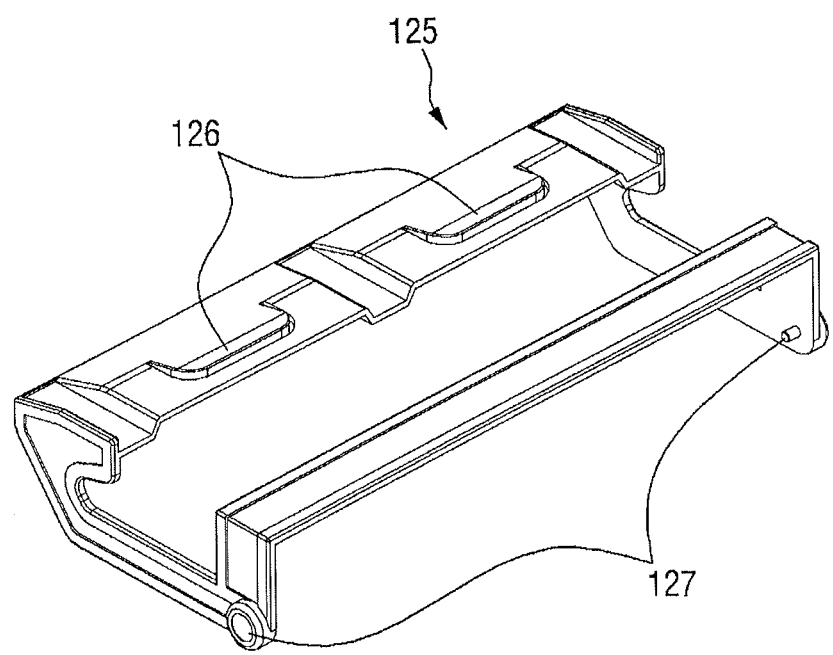
FIG. 9 illustrates an optical disk drive (ODD) holder according to an exemplary embodiment.
Figure 10:
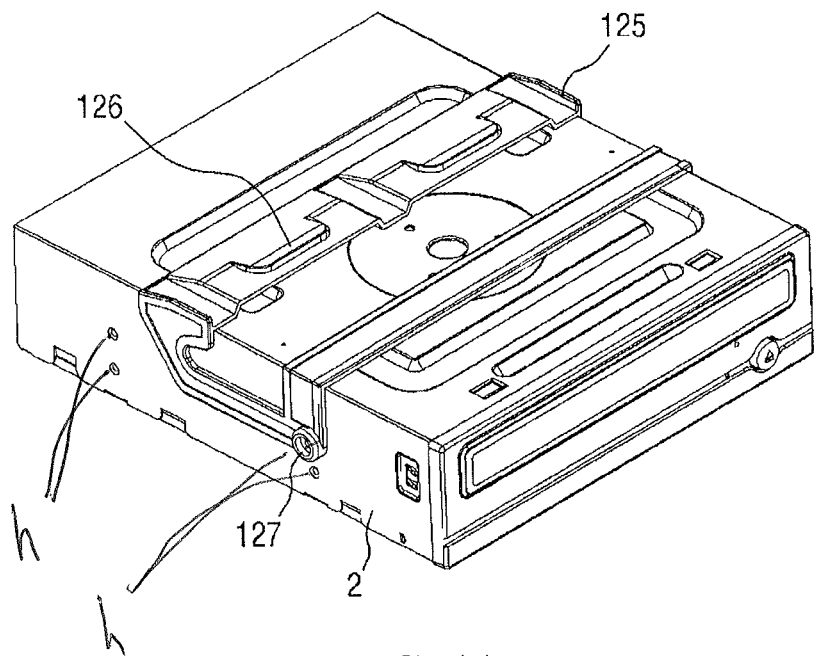
FIG. 10 illustrates an ODD coupled to the ODD holder of FIG. 9 according to an exemplary embodiment.

FIG. 9 illustrates an ODD holder 125 according to an exemplary embodiment. FIG. 10 illustrates the ODD 2 coupled to the ODD holder 125 of FIG. 9.

Referring back to FIG. 6, a PCB P connected to the ODD 2 is slid into the ODD installation area 102 of the case body 100. The ODD installation area 102 includes hook grooves used to couple the ODD holder 125 thereto in a snap-fit structure 10 as shown in FIGS. 4 and 5.

Referring to FIGS. 9 and 10, the ODD holder 125 may include ODD holder hooks 126 which are placed on the exterior of the ODD 2 and inserted into the hook grooves of the case body 100 and press pins 127 which press both side surfaces of the ODD 2.

The ODD holder 125 is connected to an upper surface and both side surfaces of the ODD 2 as shown in FIG. 10. Here, referring to FIG. 10, grooves h may be formed on both side surfaces of the ODD 2, and the press pins 127 connected to the grooves h may be provided on inner side surfaces of the ODD holder 125. The ODD holder 125 that can be installed on the outside of the ODD 2 may be used because the shape of the ODD 2 itself cannot be changed.

In addition, the ODD holder hooks 126 may be provided on a top surface of the ODD holder 125. Therefore, if the ODD holder 125 having the ODD 2 is slid into the case body 100, for example, the ODD installation area 102, the ODD holder hooks 126 are pressed down and then coupled to the hook grooves of the ODD installation area 102 in a snap-fit manner. Also, the ODD 2 can be easily separated from the ODD holder 125 by pulling the ODD 2 while pressing down the ODD holder hooks 126 of the ODD holder 125.

The ODD holder 125 may be made of a material (such as plastic) having elasticity, and the elasticity of the ODD holder 125 allows the ODD holder hooks 126 to be engaged or disengaged with corresponding hook grooves of the ODD installation area 102. In addition, portions of the ODD holder 125 which are connected to both side surfaces of the ODD 2 may be reduced in thickness to increase ductility of the ODD holder 125. Since the increased ductility makes it easy to deform the ODD holder 125, the ODD 2 can be coupled more easily to the ODD holder 125.

Figure 11:
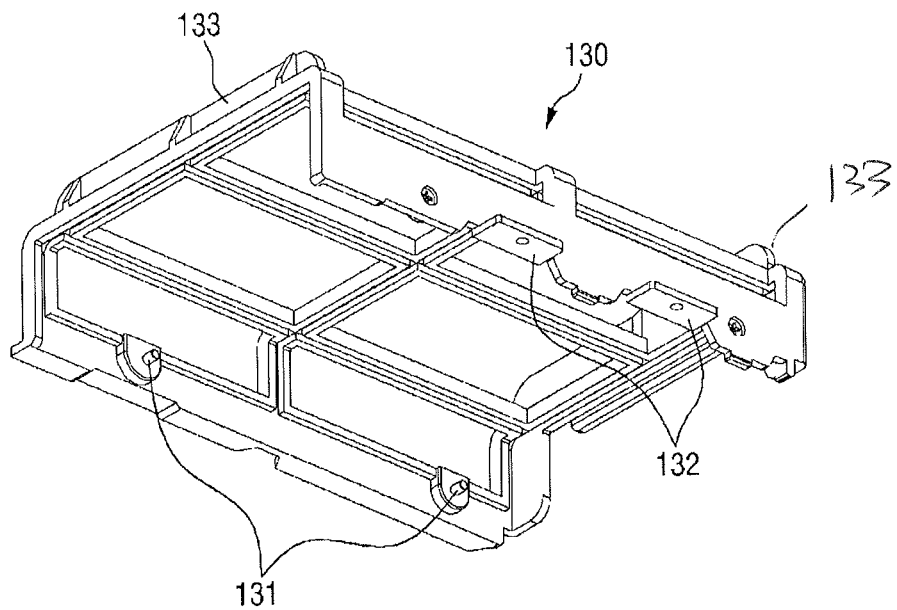
FIG. 11 illustrates a hard disk drive (HDD) holder according to an exemplary embodiment.
Figure 12:
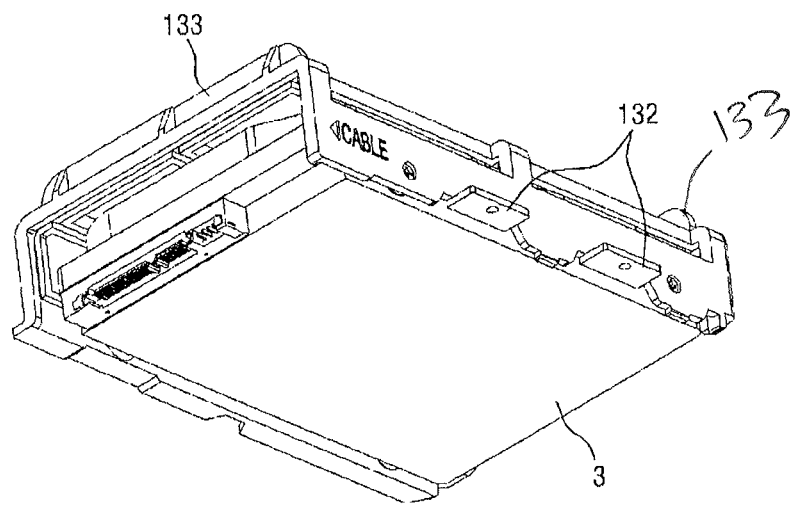
FIG. 12 illustrates an HDD coupled to the HDD holder of FIG. 11 according to an exemplary embodiment.

FIG. 11 illustrates a HDD holder 130 according to an embodiment of the present invention. FIG. 12 illustrates the HDD 3 coupled to the HDD holder 130 of FIG. 11.

Referring to FIGS. 11 and 12, the HDD holder 130, which forms a space for housing the HDD 3, may include fixing protrusions 131 which fix the HDD 3 inside the space and may also include fastening holes 132 which fastening members (not shown) are respectively inserted in order to fasten the HDD holder 130 to the case body 100.

The HDD holder 130 supports an upper surface and both side surfaces of the HDD 3. Here, the HDD 3 is fixed in position by the fixing protrusions 131 formed on inner side surfaces of the HDD holder 130. The HDD holder 130 is slid into the case body 100, thereafter the fastening members are respectively inserted into the fastening holes 132 formed on both sides of the HDD holder 130, and the HDD holder 130 is fastened to the case body 100.

The HDD holder 130 may be made of an elastic material (such as plastic), and the HDD 3 may be fixed using the elasticity of the HDD holder 130. In addition, both side surfaces of the HDD holder 130 which are connected to both side surfaces of the HDD 3 may be reduced in thickness to increase ductility of the HDD holder 130. Since the increased ductility makes it easy to deform the HDD holder 130, the HDD 3 can be coupled more easily to the HDD holder 130.

The HDD holder 130 may further include guide members 133 which guide installation of the ODD 2. That is, the ODD 2 coupled to the ODD holder 125 is placed between the guide members 133 of the HDD holder 130. Accordingly, the ODD 2 and the HDD 3 (i.e., storage devices) may be stacked in a vertical direction, thereby reducing the installation space of the ODD 2/the HDD 3.

Since the ODD 2 is installed between the guide members 133 of the HDD holder 130 to connect the HDD holder 130 and the ODD holder 125, the HDD holder 130 and the ODD holder 125 can be slid as a single holder into the case body 100.

Figure 17:
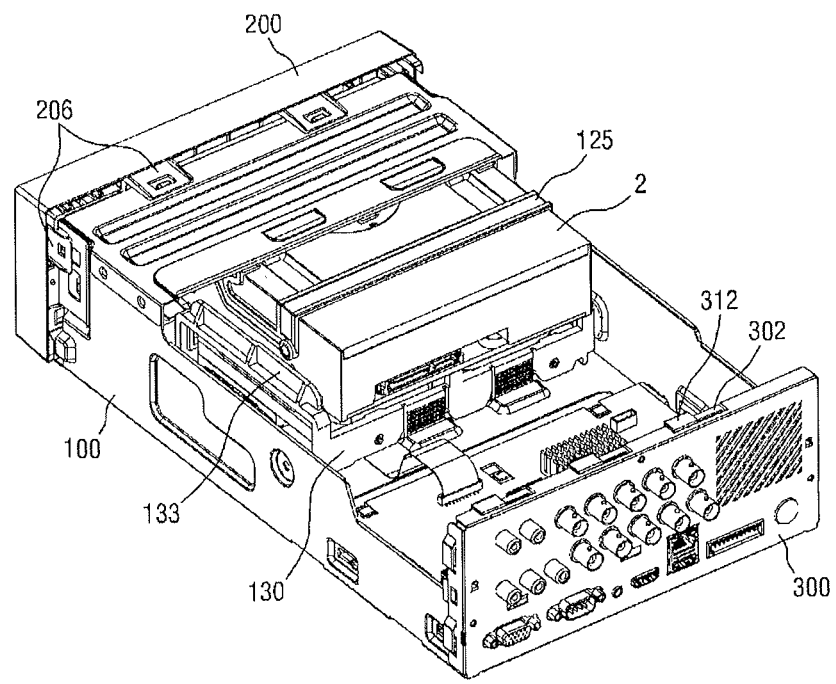
FIG. 17 is a perspective view of a video recorder according to another exemplary embodiment.

For example, in FIG. 17, a single ODD 2 and a single HDD 3 are installed in the case body 100. However, the exemplary embodiment is not limited thereto as obvious to those of ordinary skill in the art. That is, one or more HDD and one or more ODD may be stacked and installed in the case body 100.

Figure 13:
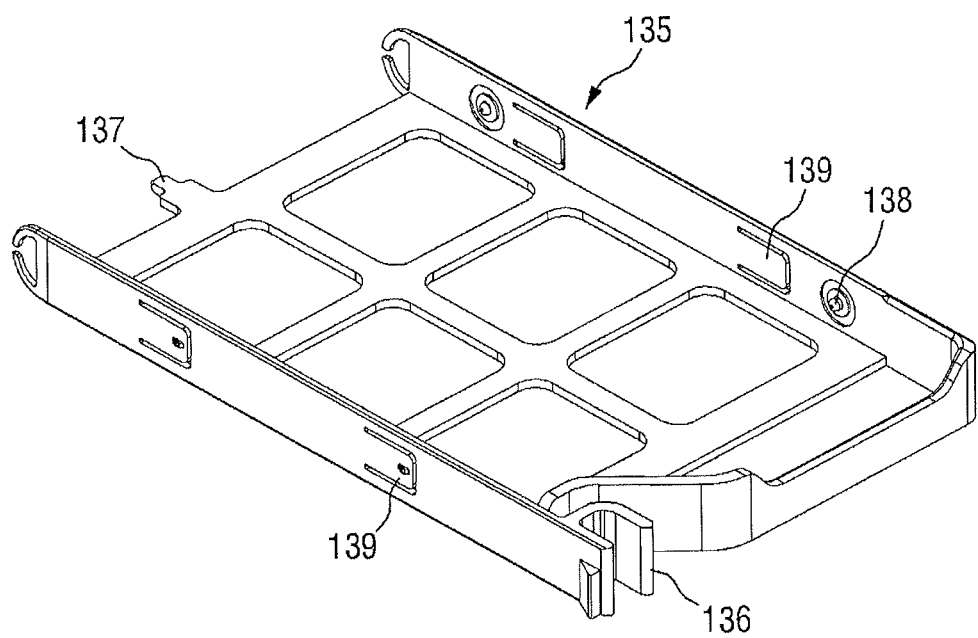
FIG. 13 illustrates an HDD holder according to another exemplary embodiment.
Figure 14:
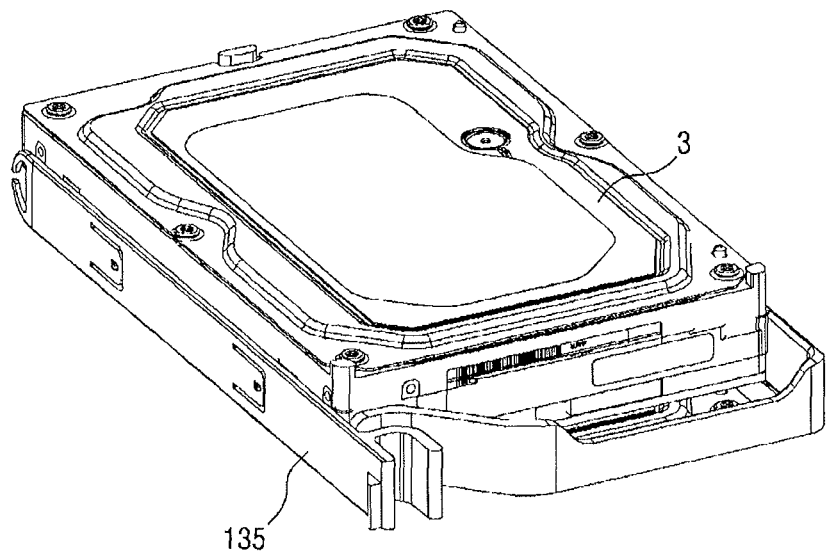
FIG. 14 illustrates the HDD coupled to the HDD holder of FIG. 13 according to an exemplary embodiment.

FIG. 13 illustrates an HDD holder 135 according to another exemplary embodiment. FIG. 14 illustrates the HDD 3 coupled to the HDD holder 135 of FIG. 13 according to an exemplary embodiment.

Referring back to FIG. 6, a PCB P connected to the HDD 3 is slid into the HDD installation area 103, and the HDD installation area 103 includes hook grooves used to couple the HDD holder 135 thereto in a snap-fit manner.

Referring to FIGS. 13 and 14, the HDD holder 135, which forms a space for housing the HDD 3, may include fixing protrusions 138 which fix the HDD 3 inside the space. The HDD holder 135 may further include an HDD holder hook 137 which is located on a front side of the HDD holder 135 and inserted into a hook groove of the case body 100 and an HDD holder auxiliary hook 136 which is located on a rear side of the HDD holder 135 and coupled to a frame 105 of the case body 100.

The HDD holder 135 supports a lower surface and both side surfaces of the HDD 3. Here, the HDD 3 is fixed in position by the fixing protrusions 138 formed on inner side surfaces of the HDD holder 135. If the HDD holder 135 is inserted into the HDD installation area 103, the HDD holder hook 137 on the front side of the HDD holder 135 is coupled to a hook groove of the HDD installation area 103, and the HDD holder auxiliary hook 136 on the rear side of the HDD holder 135 is coupled onto a vertical frame 105 of the HDD installation area 103 in a snap-fit structure.

In addition, slits 139 are formed in both side surfaces of the HDD holder 135. The slits 139 give tension when the HDD 3 is slid into the HDD holder 135. The HDD holder 135 may be made of an elastic material (such as plastic), and the elasticity of the HDD holder 135 may be used. In addition, both side surfaces of the HDD holder 135 which are connected to both side surfaces of the HDD 3 may be reduced in thickness to increase ductility of the HDD holder 135. Since the increased ductility makes it easy to deform the HDD holder 135, the HDD 3 can be coupled more easily to the HDD holder 135.

Figure 15:
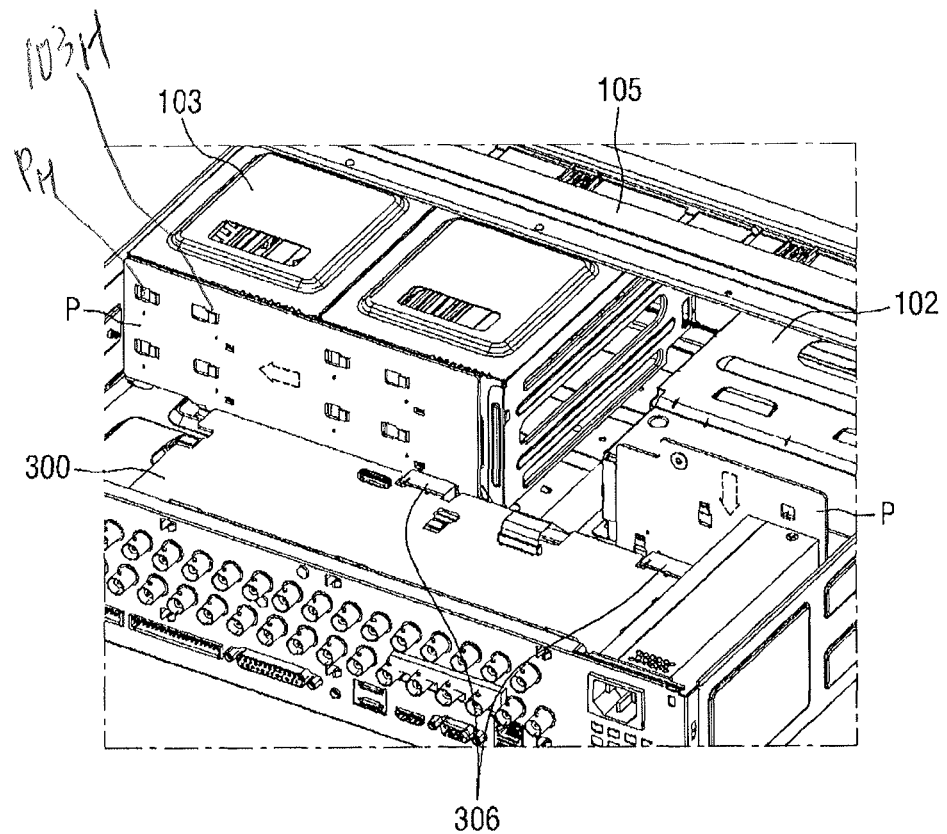
FIG. 15 is a rear view of the assembly structure of the ODD and the HDD in the video recorder of FIG. 6 according to an exemplary embodiment.
Figure 16:
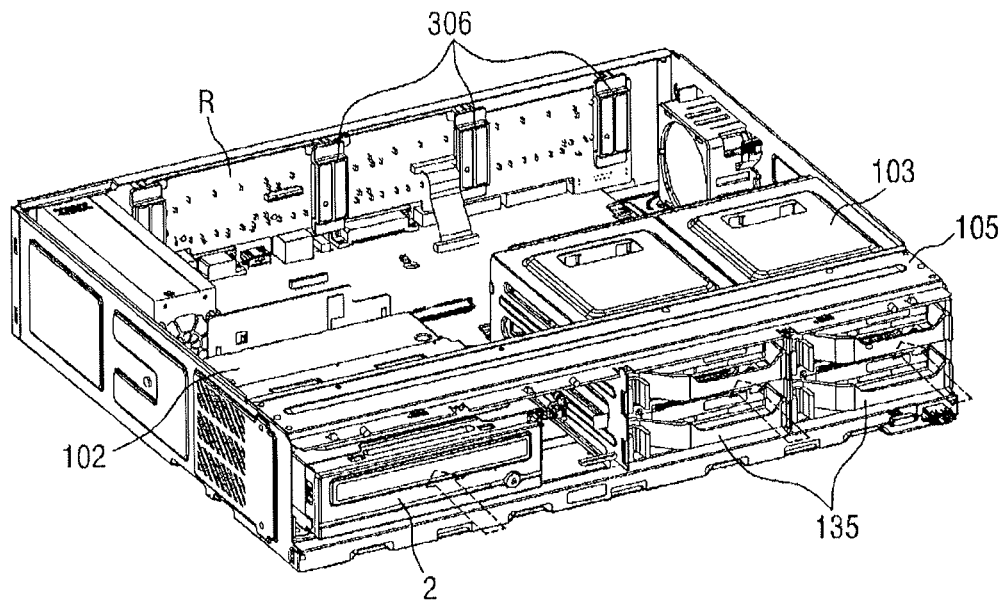
FIG. 16 is a front view of the assembly structure of the ODD and the HDD in the video recorder of FIG. 6 according to an exemplary embodiment.

FIG. 15 is a rear view of the assembly structure of the ODD 2 and the HDD 3 in the video recorder of FIG. 6 according to an exemplary embodiment. FIG. 16 is a front view of the assembly structure of the ODD 2 and the HDD 3 in the video recorder of FIG. 6 according to an exemplary embodiment.

Referring to FIGS. 15 and 16, the ODD 2 connected to the ODD holder 125 is slid into the ODD installation area 102, and the HDD 3 connected to the HDD holder 135 is slid into the HDD installation area 103. Here, the ODD holder 125 and the HDD holder 135 are respectively coupled to the ODD installation area 102 and the HDD installation area 103 by the snap-fir structure (i.e., hooks) as exemplified in FIGS. 4 and 5. Thus, no screws are required. In the figures, one ODD 2 is installed in the ODD installation area 102, and four HDDs 3 are installed in the HDD installation area 103. However, the exemplary embodiment is not limited thereto as obvious to those of ordinary skill in the art. That is, the number of ODDs 2 and the number of HDDs 3 installed in the respective installation areas may be varied depending on the application.

The PCB P is slid into each of the ODD installation area 102 and the HDD installation area 103. That is, the PCB P connected to the ODD 2 is slid into the ODD installation area 102, and the PCB P connected to the HDD 3 is slid into the HDD installation area 103. For example, as illustrated in FIG. 15, one or more hooks 103H may be provided in a rear portion of each of the ODD installation area 102 and the HDD installation area 103, and one or more grooves $P_H$ formed in the PCB P may be coupled to the hooks 103H by pushing the PCB P in a sliding manner as shown in the dotted arrow.

In addition, the ODD 2 and the HDD 3 are slid into the ODD installation area 102 and the HDD installation area 103, respectively. For example, as illustrated in FIG. 16, the ODD 2 connected to the ODD holder 125 and the HDD 3 connected to the HDD holder 135 may be slid in a direction from a front side of the ODD installation area 102 and the HDD installation area 103 toward a rear side thereof (as shown with a dotted arrow). Here, hooks (i.e., the ODD holder hooks 126 and the HDD holder hook) formed on each of the ODD holder 125 and the HDD holder 135, respectively, may be coupled to corresponding hook grooves formed in each of the ODD installation area 102 and the HDD installation area 103 in a snap-fit manner.

In FIGS. 15 and 16, the ODD 2 and the HDD 3 are arranged horizontally, and the HDD holder 135 of FIG. 13 is used. However, various other arrangement structures are possible. For example, the ODD 2 and the HDD 3 can be arranged vertically, and the HDD holder 130 of FIG. 11 can be used. This exemplary arrangement will be described in more detail below.

Figure 18:
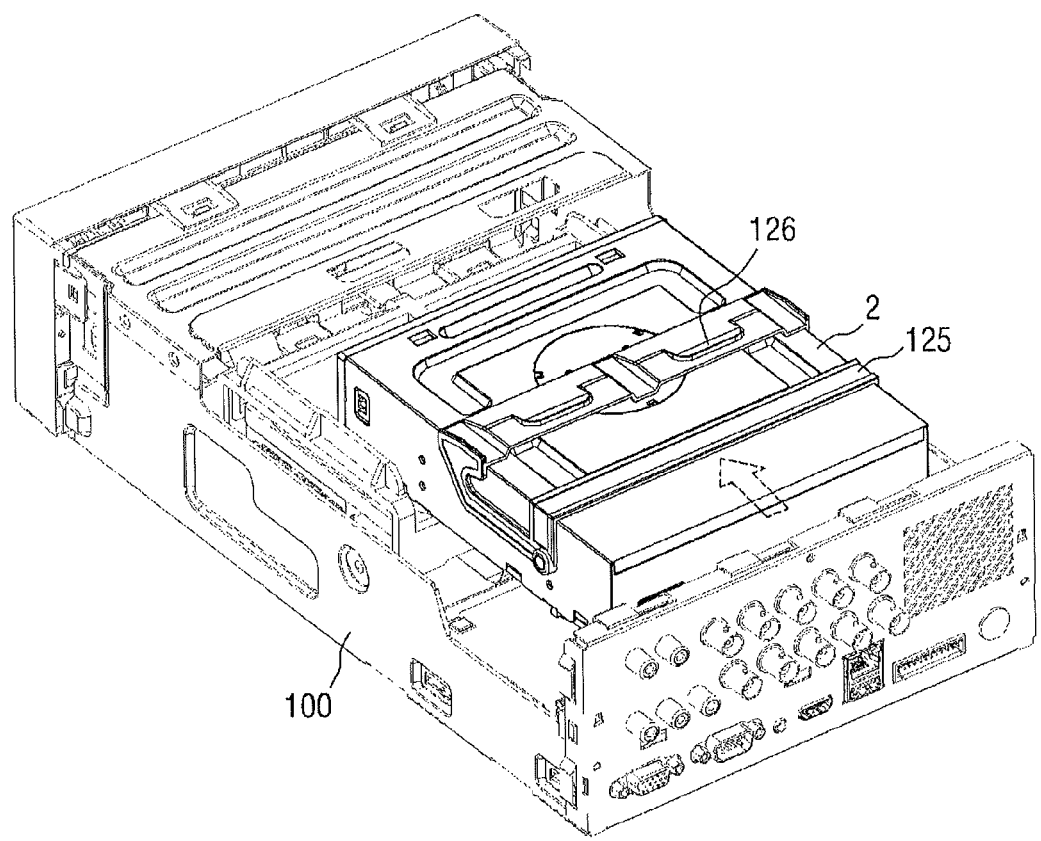
FIG. 18 illustrates an ODD coupled to an ODD holder and installed accordingly in the video recorder of FIG. 17 according to an exemplary embodiment.

FIG. 17 is a perspective view of a video recorder according to another exemplary embodiment. FIG. 18 illustrates an ODD 2 coupled to an ODD holder 125 and installed accordingly in the video recorder of FIG. 17 according to an exemplary embodiment.

Referring to FIG. 17, the video recorder according to the exemplary embodiment includes a case body 100, a front panel 200, and a rear panel 300. A space for housing various electronic parts is formed inside the case body 100. In addition, the ODD holder 125 into or from which the ODD 2 can be inserted or removed and an HDD holder 130 into or from which an HDD 3 can be inserted or removed are pushed or slid into the case body 100. The front panel 200 covers a front side of the case body 100, and the rear panel 300 covers a rear side of the case body 100. The front panel 200 and the rear panel 300 are coupled to the case body 100 in a snap-fit manner as previously discussed regarding FIGS. 4 and 5. To this end, hook grooves and hooks coupled to the hook grooves may be formed in various portions of the case body 100 and the front and rear panels 200 and 300. After the assembly of the video recorder, a case cover (not illustrated) for closing an opening at the top of the case body 100 is connected to the top of the case body 100. The case cover may form only an upper surface of the case body 100 or the upper surface and at least one side surface of the case body 100. In addition, various frames (See frames 105 in FIG. 6) and brackets are installed inside the case body 100, and the case body 100 includes a lower surface and left and right side surfaces.

Referring to FIG. 18, ODD holder hooks 126 are formed at a top surface of the ODD holder 125. Therefore, if the ODD holder 125 including the ODD 2 is slid into the case body 100, the ODD holder hooks 126 are pressed down and then coupled to hook grooves of the case body 100 in a snap-fit manner. In addition, the ODD 2 can be easily separated from the ODD holder 125 by pulling the ODD 2 while pressing down the ODD holder hooks 126 of the ODD holder 125. Here, since the ODD 2 coupled to the ODD holder 125 is placed between guide members 133 of the HDD holder 130, the ODD 2 and the HDD 3 (i.e., storage devices) are arranged vertically, thereby reducing the installation space of the ODD 2/the HDD 3.

Therefore, since the ODD 2 is installed on the HDD holder 130 to connect the HDD holder 130 and the ODD holder 125, the HDD holder 130 and the ODD holder 125 can be slid as a single holder into the case body 100.

Figure 19:
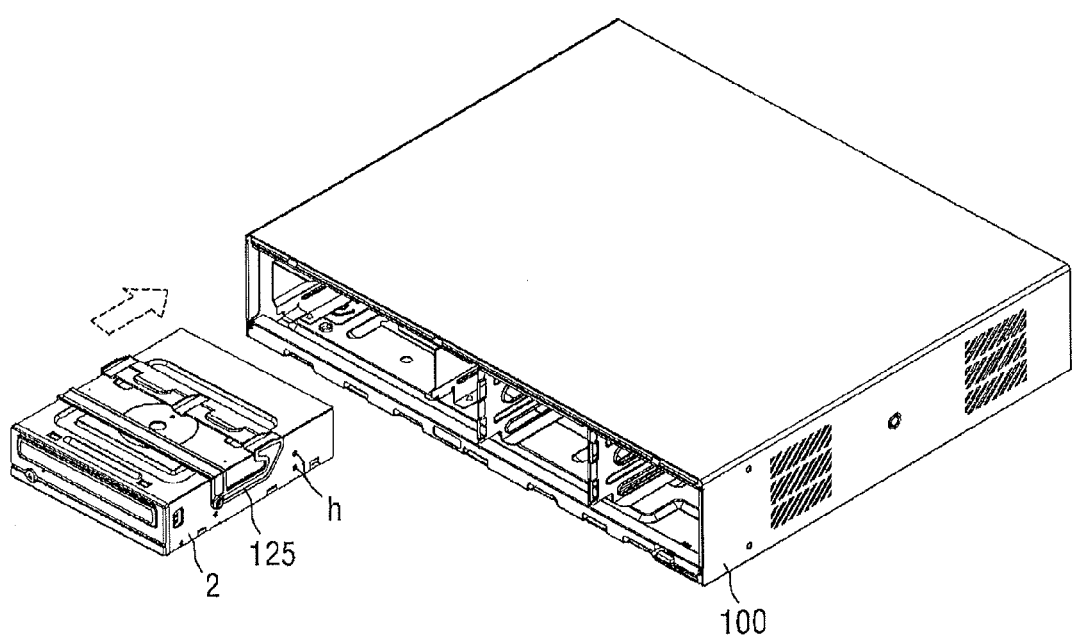
FIG. 19 illustrates an ODD coupled to an ODD holder and installed accordingly in a video recorder according to another exemplary embodiment.

FIG. 19 illustrates an ODD 2 coupled to an ODD holder 125 and installed accordingly in a video recorder according to another exemplary embodiment.

In the related art, the ODD 2 may include four grooves h one both side surfaces thereof. These four grooves allow a direction in which the ODD holder 125 being assembled to be reversible. Accordingly, a direction in which the ODD 2 is assembled in the case body 100 of the video recorder can also be reversed and provides flexibility in design.

For example, referring to FIG. 19, the direction in which the ODD 2 is assembled may be selected according to the structure of the video recorder by appropriately selecting the grooves h of the ODD 2 to engage with press pins 127 (see FIG. 9) of the ODD holder 125.

Figure 20:
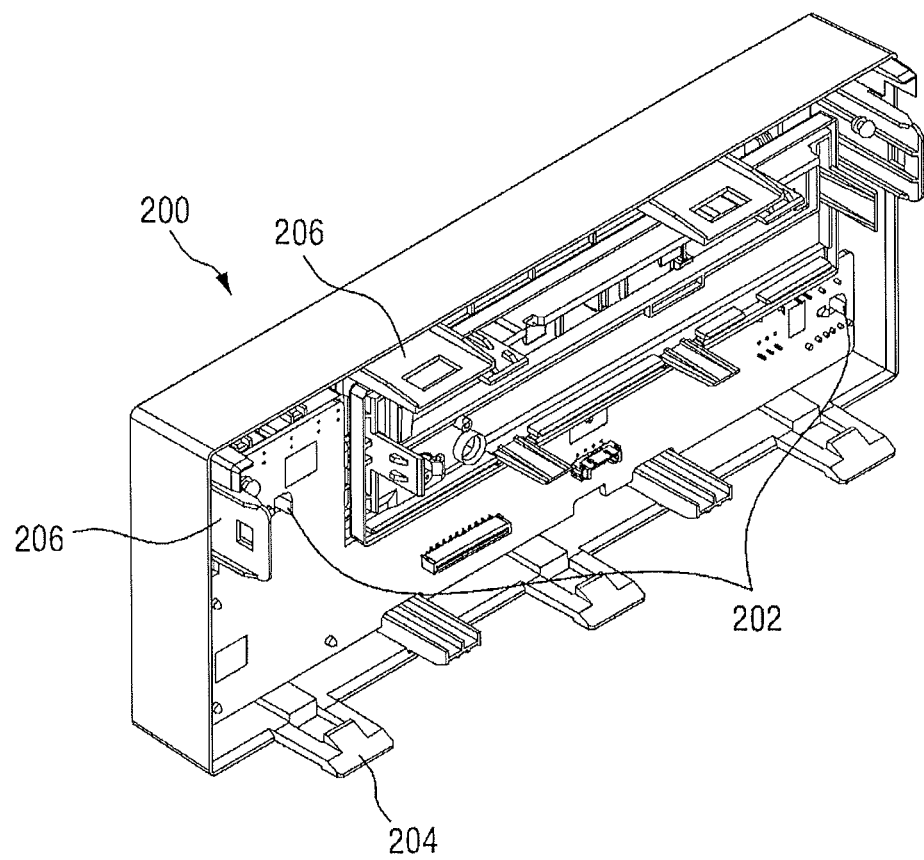
FIG. 20 illustrates a front panel according to an exemplary embodiment.

FIG. 20 illustrates a front panel 200 according to an exemplary embodiment.

The front panel 200 is coupled to a front side of a case body 100 in a snap-fit manner. The front panel 200 is a panel on which various buttons used by a user to operate a device (i.e. a video recorder), a display displaying the operating state of the device, a light-emitting diode (LED), etc. are installed. The front panel 200 may be formed by stacking a conductive material on a metallic conductive material or an insulating material such as plastic.

Referring to FIG. 20, a front PCB F (FIG. 6) is coupled to guide ribs 202 of the front panel 200 in a snap-fit manner. In addition, the front panel 200 includes various coupling hooks 204 and hook grooves 206 for coupling to the case body 100 in a snap-fit manner.

Figure 21:
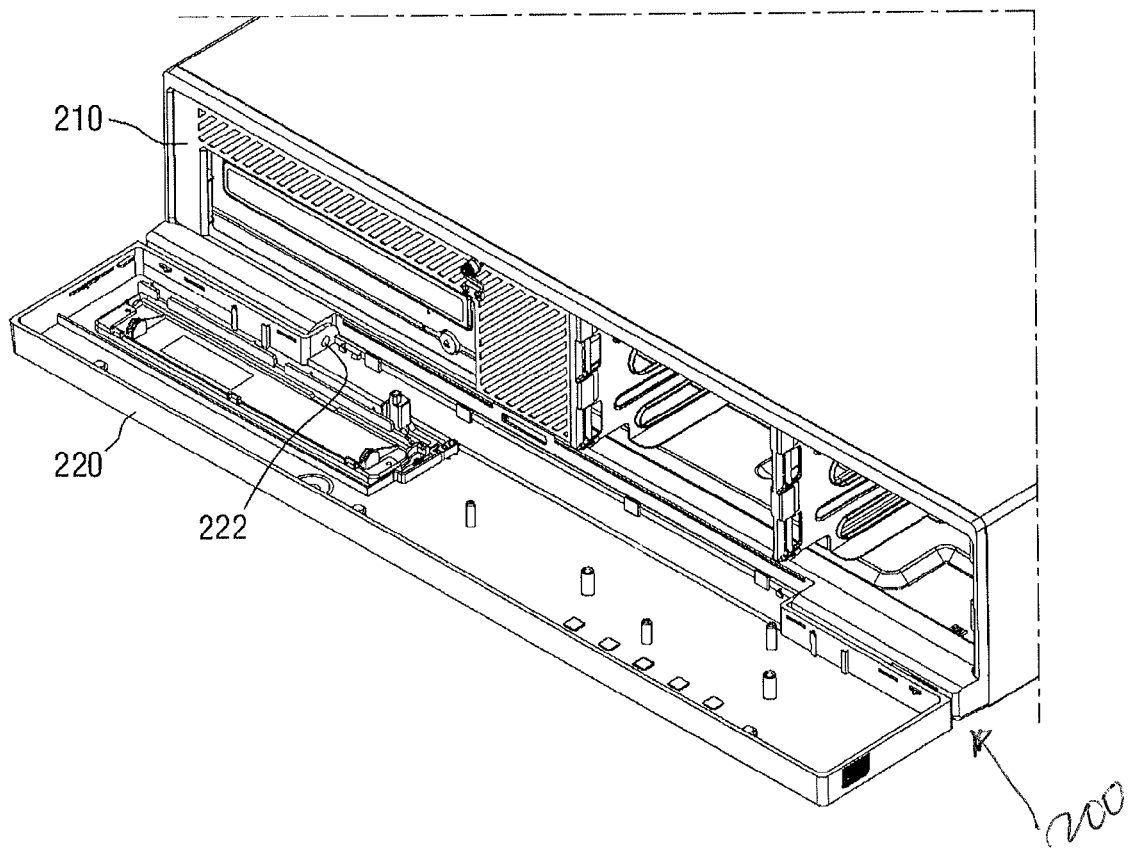
FIG. 21 illustrates a front panel according to another exemplary embodiment.
Figure 22:
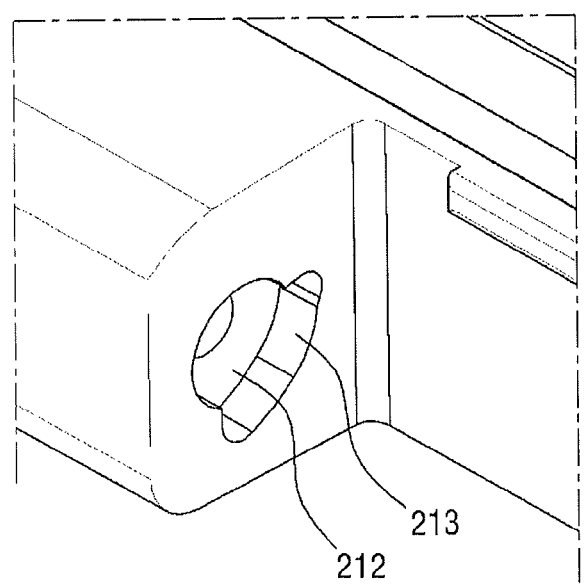
FIG. 22 is a partial view of a cover of the front panel of FIG. 21 according to an exemplary embodiment.
Figure 23:
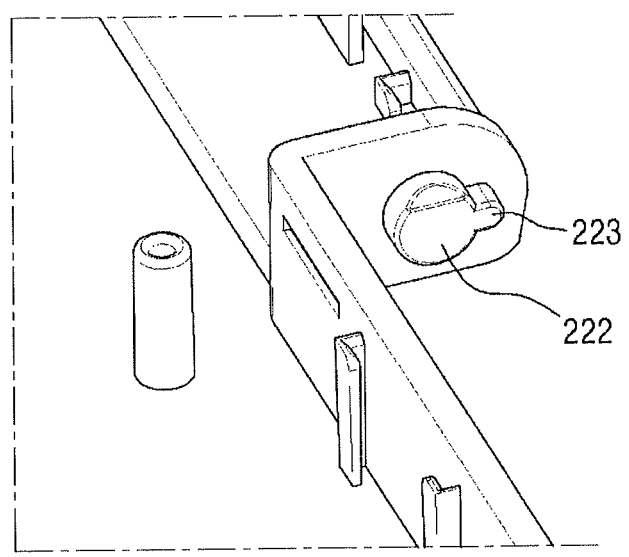
FIG. 23 is a partial view of a door of the front panel of FIG. 21 according to an exemplary embodiment.
Figure 24A:
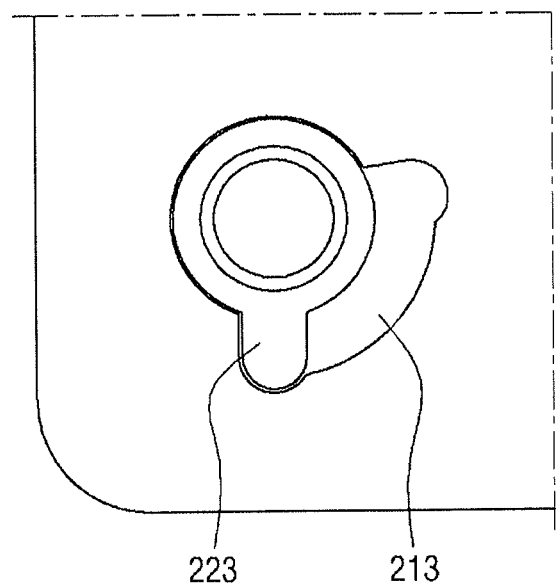
FIGS. 24A through 24C respectively illustrate connection structures between the cover and the door according to exemplary embodiments.
Figure 24B:
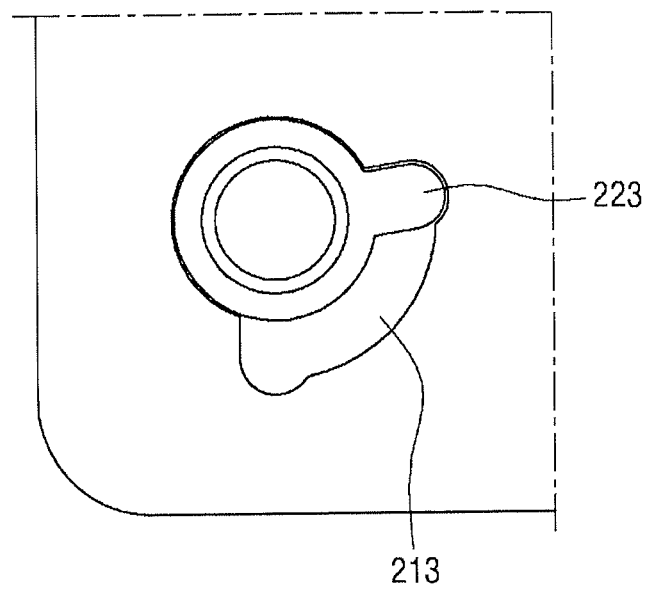
Figure 24C:
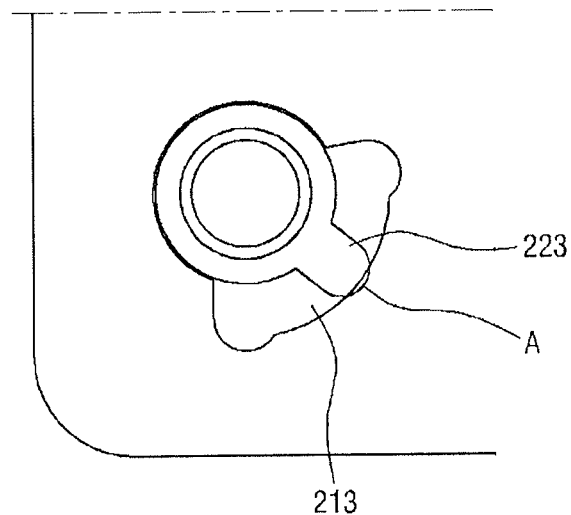

FIG. 21 illustrates a front panel 200 according to another exemplary embodiment. FIG. 22 is a detailed partial view of a cover 210 of the front panel 200 of FIG. 21. FIG. 23 is a partial view of a door 220 of the front panel 200 of FIG. 21. FIGS. 24A through 24C respectively illustrate connection structures between the cover 210 and the door 220 according to exemplary embodiments.

The front panel 200 is coupled to a front side of a case body 100 in a snap-fit manner by the coupling hooks 204 and the hook grooves 206.

Referring to FIG. 21, the front panel 200 may include the cover 210 on which the front PCB F is installed and the door 220 which opens or closes the cover 210.

Referring to FIGS. 22 and 23, the cover 210 may include an insertion groove 212 and an extension groove 213 which is cut along part of an outer circumferential surface of the insertion groove 212. The door 220 may include an insertion protrusion 222 which is inserted into the insertion groove 212 and an extension protrusion 223 which extends from an end of the insertion protrusion 222. This connection structure between the cover 210 and the door 220 allows a front side of a video recorder covered with the front panel 200 to be opened or closed using the door 200 without an additional component such as a hinge.

FIGS. 24A through 24C respectively illustrate positions of the extension protrusion 223 in the extension groove 213 in cases where the door 220 is closed, fully opened, and being opened. When the extension groove 213 is cut along the outer circumferential surface of the insertion groove 212 of the cover 210, both end regions of the extension groove 213 may be formed slightly wider than a middle region thereof in the radial direction of the extension protrusion 223. Therefore, a slightly greater force is required when the extension protrusion 223 is rotated from the positions illustrated in FIGS. 24A and 24C, which gives the feel of detent to a user who opens or closes the door 220. In addition, since both end regions of the extension groove 213 are slightly wider than the middle region of the extension groove 213, when the extension protrusion 223 is rotated in the extension groove 213, an end of the extension protrusion 223 may contact the middle region of the extension groove 213 as indicated by reference character 'A'. Therefore, friction may be generated as a result. The friction may cause the door 220 to be opened slowly, not at once. That is, the friction generated when the end of the extension protrusion 223 contacts the middle region of the extension groove 213 realizes a free stop, and the end of the extension protrusion 223 plays a role as a stopper at a maximum angle (at which the door 220 is completely opened) and a minimum angle (at which the door 220 is completely closed).

Figure 25:
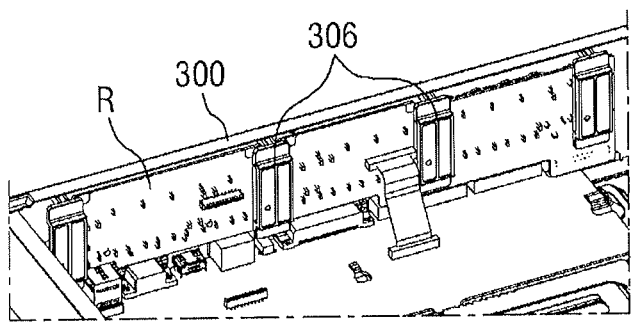
FIG. 25 illustrates a rear panel according to an exemplary embodiment viewed from inside of the rear panel.
Figure 26:
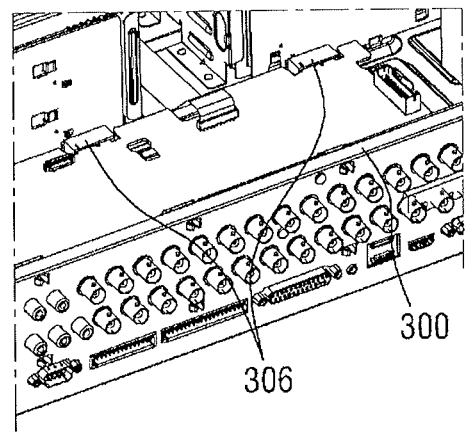
FIG. 26 illustrates the rear panel of FIG. 25 viewed from outside of the rear panel according to an exemplary embodiment.
Figure 27A:
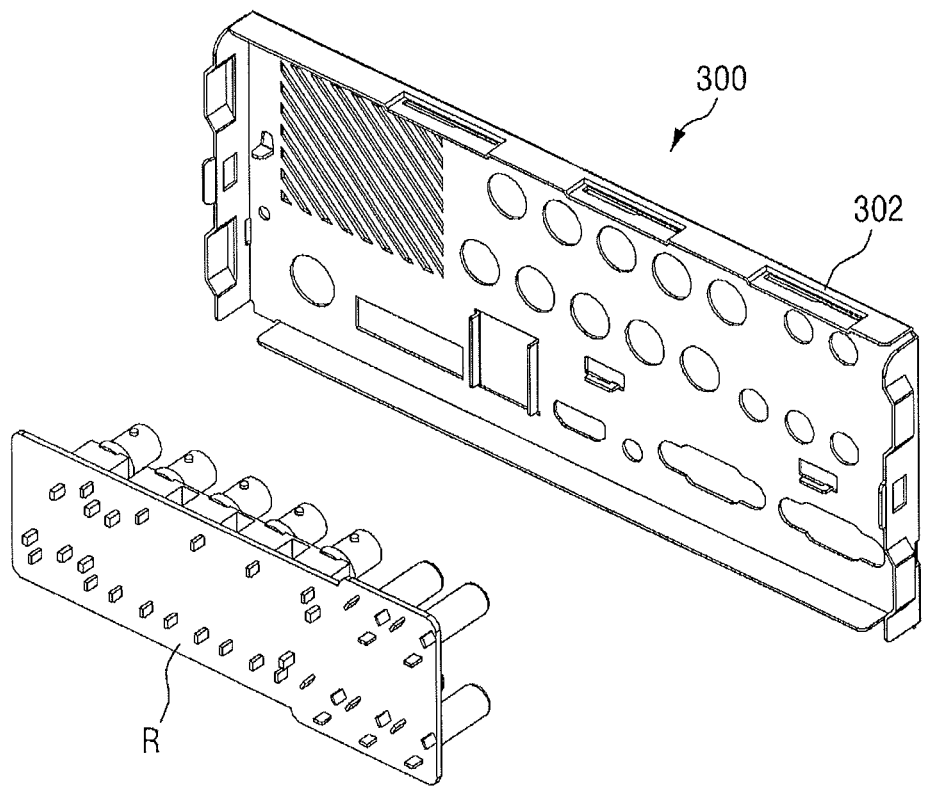
FIGS. 27A through 27D illustrate the assembly order of a rear panel according to another exemplary embodiment.
Figure 27B:
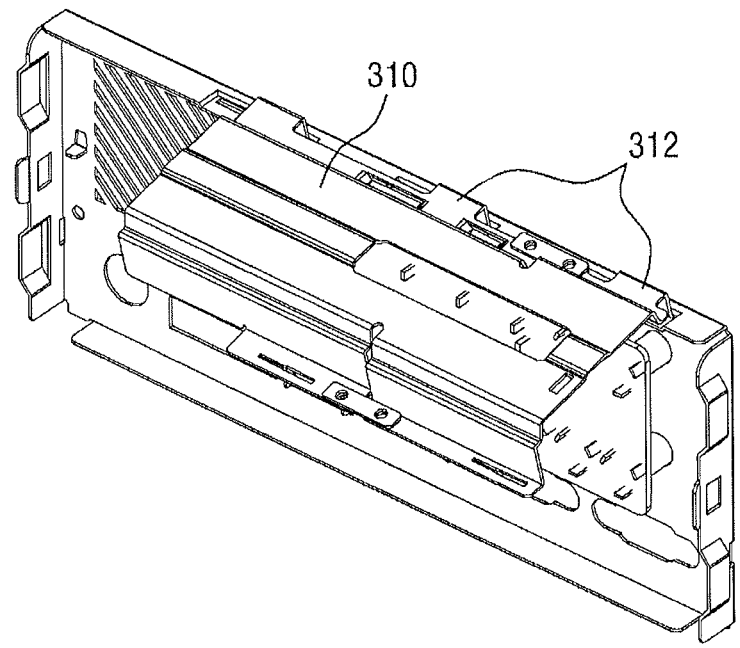
Figure 27C:
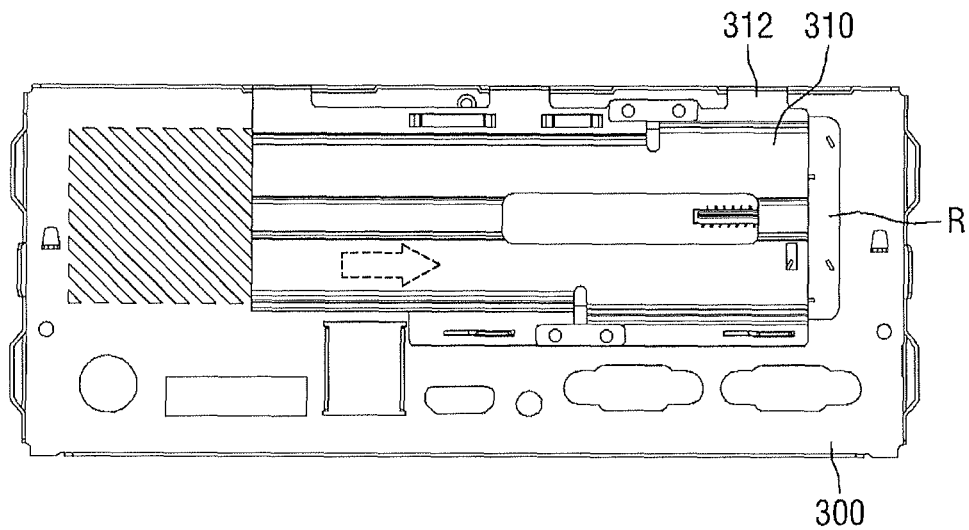
Figure 27D:
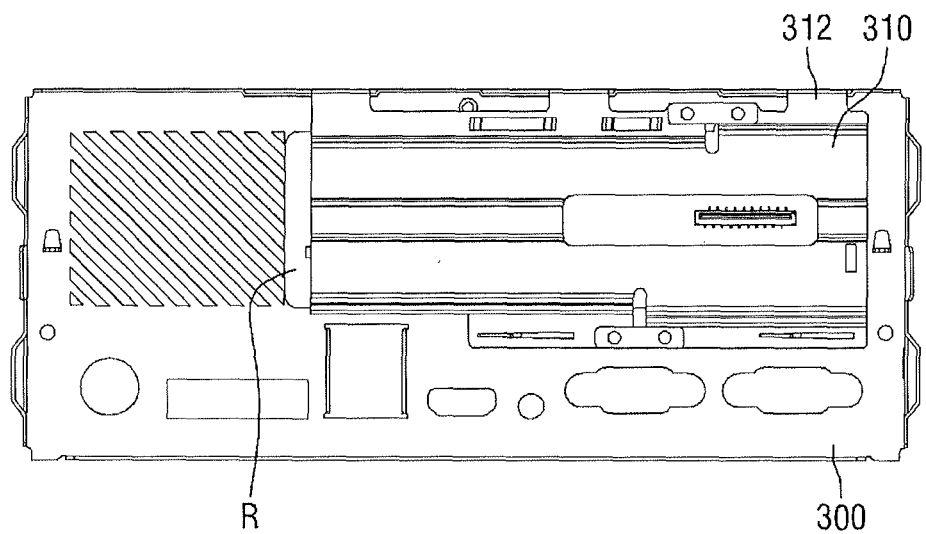

FIG. 25 illustrates a rear panel 300 according to an exemplary embodiment viewed from inside of the rear panel 300. FIG. 26 illustrates the rear panel 300 of FIG. 25 viewed from outside of the rear panel 300.

The rear panel 300 is coupled to a rear side of a case body 100 in a snap-fit manner similar to the embodiment of the front panel 200 discussed above. In addition, the rear panel 300 may include a plurality of brackets 306 for fixing a rear PCB R on which connection terminals for providing connection jacks with an external device are mounted. Since the rear PCB R is fixed to the rear panel 300 by the brackets 306 in the snap-fir manner, no additional screws are required.

FIGS. 27A through 27D illustrate the assembly order of a rear panel 300 according to an exemplary embodiment.

The rear panel 300 is coupled to a rear side of a case body 100 in a snap-fit manner. To this end, the rear panel 300 includes a rear holder 310 for connecting a rear PCB R, on which connection terminals for providing connection jacks with an external device are mounted, to the rear panel 300. Since the rear PCB R is fixed to the rear panel 300 by the rear holder 310, no screws are required. Specifically, to mount the rear PCB R on the rear panel 300, rear holder hooks 312 of the rear holder 310 are coupled to hook grooves 302 of the rear panel 300 in a snap-fit manner.

Referring to FIGS. 27A through 27D, the rear PCB R is mounted on the rear panel 300, and the rear holder 310 supporting the rear PCB R is coupled to the rear panel 300 in a snap-fit manner. Here, the rear holder hooks 312 of the rear holder 310 are inserted into the hook grooves 302 of the rear panel 300 in a snap-fit manner, and the rear holder 310 is coupled to the rear panel 300 by sliding the rear holder 310 in a predetermined direction after the rear holder hooks 312 being inserted into the hook grooves 302. As a result, the rear PCB R is fixed to the rear panel 300. That is, since the rear PCB R is fixed to the rear panel 300 in a snap-fit structure and in a sliding manner, no screws are required.

A case body, a front panel, and a rear panel can be selected from the case bodies 100, the front panels 200, and the rear panels 300 according to the above-described exemplary embodiments in view of the size and function of a video recorder, and the selected front and rear panels can be coupled to the selected case body using snap-fit structures 10 (i.e., hooks and hook grooves) to assemble the video recorder without using screws. In addition, since a case body, a front panel, and a rear panel can be selected from the case bodies 100, the front panels 200, and the rear panels 300 according to the above-described exemplary embodiments, various types of video recorders may be designed.

As described above, video recorders according to exemplary embodiments can be assembled by coupling a case body and front and rear panels to each other in a snap-fit manner without using coupling members such as screws. In addition, since parts installed in a video recorder are coupled to each other in a sliding manner, they can be easily assembled and separated. Further, an ODD, an HDD, etc. can be easily installed in the video recorder using removable holders, not using screws. Therefore, a screwless video recorder can be implemented.

According to the present inventive concept, a plurality of parts that constitute a video recorder can be easily assembled without using screws and other tools.

In addition, since each part can be coupled to the video recorder without using screw and other tools, work time can be reduced, and the parts can be easily separated and replaced.

Accordingly, this can improve the work convenience and productivity of production line workers and provide a user of the video recorder with ease of assembly.

While exemplary embodiments have been particularly shown and described above, it will be understood by those of ordinary skill in the art that various changes in provide and detail may be made therein without departing from the spirit and scope of the inventive concept as defined by the following claims.

What is claimed is:

1. A video recorder comprising:
a case body comprising a space for housing a plurality of electronic parts, the plurality of electronic parts comprising:
an optical disk drive (ODD) holder attached to an ODD; and
a hard disk drive (HDD) holder attached to an HDD;
a front panel on which a front printed circuit board (PCB) is mounted and which covers a front side of the case body, the front panel comprising:
a cover on which the front PCB is mounted; and
a door configured to expose or close the cover based on rotation of the door with respect to the case body; and
a rear panel on which a rear PCB is mounted and which covers a rear side of the case body,
wherein the cover comprises:
an insertion groove; and
an extension groove radially cut along a part of an outer circumferential surface of the insertion groove, and
wherein the door comprises:
an insertion protrusion configured to be inserted into the insertion groove; and
an extension protrusion protruding radially from an outer circumferential surface of the insertion protrusion.

2. The video recorder of claim 1, wherein the ODD and the HDD are detachably attached to the ODD holder and the HDD holder, respectively.

3. The video recorder of claim 1, wherein the case body and the front panel are coupled to each other by a snap-fit structure, and the case body and the rear panel are coupled to each other by the snap-fit structure.

4. The video recorder of claim 3, wherein the snap-fit structure comprises a hook and a hook groove, and
wherein one of the hook and the hook groove is provided on one of the case body and the front or rear panel, and the other of the hook and the hook groove is provided on the other of the case body and the front or rear panel.

5. The video recorder of claim 1, wherein plurality of electronic parts further comprises:
a switching mode power supply (SMPS) configured to be slid into the case body; and
a fan holder having a detachable fan and configured to be slid into the case body.

6. The video recorder of claim 5, wherein the case body comprises:

a guide hook configured to guide sliding of the SMPS and configured to support the SMPS on a front portion of the SMPS;

supports configured to guide sliding of the SMPS and support the SMPS on side portions of the SMPS; and a stopper configured to fix the SMPS on a top surface of the SMPS.

7. The video recorder of claim 5, wherein the case body comprises hook grooves, and the fan holder comprises holder fixing hooks, wherein the holder fixing hooks are configured to be inserted into the hook grooves.

8. The video recorder of claim 7, wherein the fan holder further comprises fan fixing hooks configured to fix the fan to the fan holder.

9. The video recorder of claim 1, wherein the ODD holder comprises:

ODD holder hooks; and press pins;

wherein the case body comprises hook grooves, the ODD holder hooks configured to be inserted into the hook grooves, and wherein the press pins are coupled to grooves provided on side surfaces of the ODD.

10. The video recorder of claim 1, wherein the HDD holder providing a space for housing the HDD and comprising:

fixing protrusions configured to fix the HDD inside the space; and fastening holes configured to receive fasteners to fasten the HDD holder to the case body.

11. The video recorder of claim 10, wherein the fastening holes are provided on side surfaces of the HDD holder.

12. The video recorder of claim 10, wherein the HDD holder further comprises a guide configured to guide installation of the ODD, wherein the ODD is configured to be installed on and connected to the HDD holder by the guide, and wherein the HDD holder and the ODD holder are configured to be slidable as a single holder into the case body.

13. The video recorder of claim 10, wherein the HDD holder comprises an HDD holder hook provided on a front side thereof.

14. The video recorder of claim 13, wherein the HDD holder further comprises an HDD holder auxiliary hook provided on a rear side of the HDD holder and configured to be coupled to a frame of the case body.

15. The video recorder of claim 1, wherein the front panel comprises guide ribs configured to couple the front PCB with the front panel in a snap-fit manner.

16. The video recorder of claim 1, wherein in response to the rotation of the door, the extension protrusion rotates along an outer circumferential surface of the extension groove, a radial end of the extension protrusion contacts the extension groove, and the contact between the radial end of the extension protrusion and the extension groove generates friction.

17. The video recorder of claim 1, wherein the rear panel comprises a plurality of brackets configured to fix the rear PCB.

18. The video recorder of claim 1, wherein the rear panel comprises a rear holder configured to support the rear PCB coupled to the rear panel in a snap-fit manner.

* * * * *